Jan. 4, 1944.　　　　　J. L. SEATON　　　　　2,338,462
TIRE CAPPING MACHINE
Filed Oct. 3, 1941　　　　3 Sheets-Sheet 1

Inventor
Jesse L. Seaton

By Clarence A. O'Brien

Attorney

Jan. 4, 1944.  J. L. SEATON  2,338,462
TIRE CAPPING MACHINE
Filed Oct. 3, 1941  3 Sheets-Sheet 2

Inventor
Jesse L. Seaton

By Clarence A. O'Brien
Attorney

Jan. 4, 1944. J. L. SEATON 2,338,462
TIRE CAPPING MACHINE
Filed Oct. 3, 1941 3 Sheets-Sheet 3
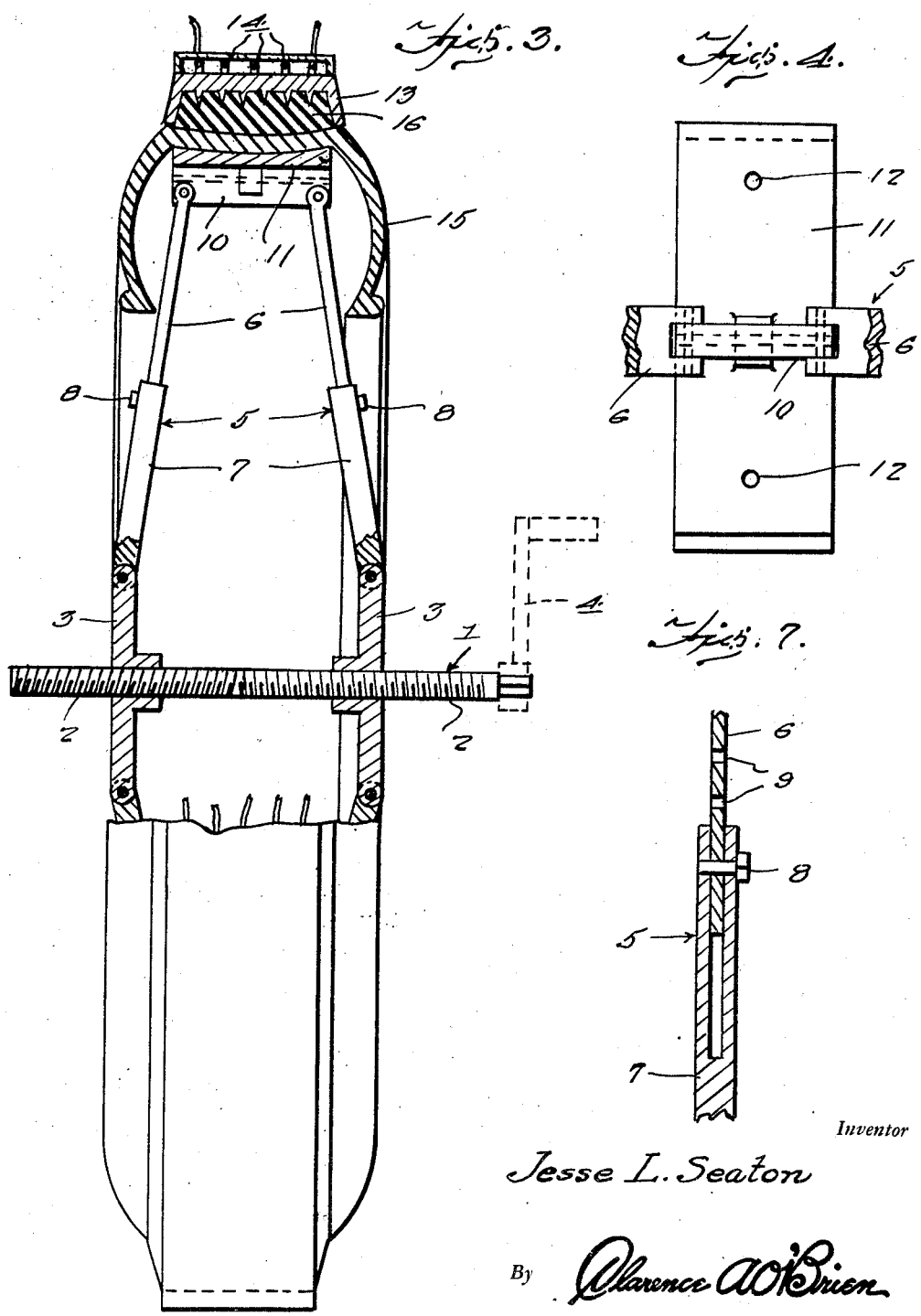
Inventor
Jesse L. Seaton
By Clarence A. O'Brien
Attorney Patented Jan. 4, 1944

2,338,462

UNITED STATES PATENT OFFICE 2,338,462

TIRE CAPPING MACHINE

Jesse L. Seaton, Springfield, Mo.

Application October 3, 1941, Serial No. 413,529

1 Claim. (Cl. 18—18)

The present invention relates to new and useful improvements in tire capping machines and has for one of its important objects to provide, in a manner as hereinafter set forth, a machine of this character which embodies a construction and arrangement whereby the central portion of the tread, which receives the most wear, will be made comparatively thick.

Another very important object of the invention is to provide a tire capping machine of the aforementioned character wherein overheating of the casing will be prevented.

Still another very important object of the invention is to provide a tire capping machine of the character described which is adapted for tires of various sizes within a wide range.

Other objects of the invention are to provide a tire capping machine of the character set forth which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view principally in vertical cross section through the machine.

Figure 4 is a plan view of one of the pressure heads and the elements on which it is pivotally mounted.

Figure 7 is a detail view in vertical section through an intermediate portion of one of the extensible toggles.

Figure 1:
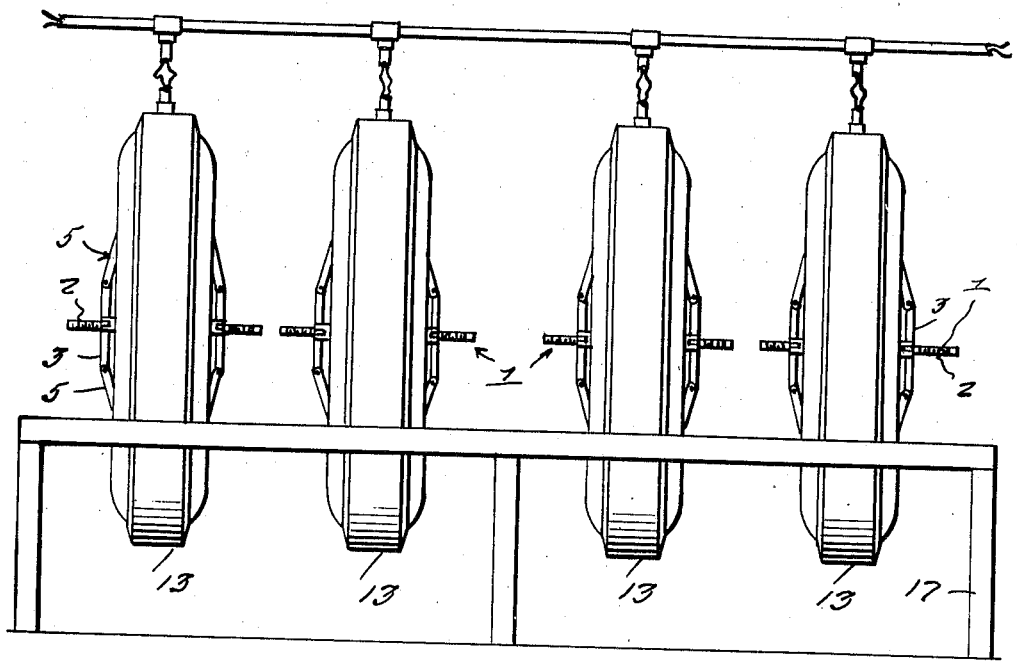
Figure 1 is an elevational view, showing a plurality of tire capping machines constructed in accordance with the present invention in use on a rack.
Figure 5:
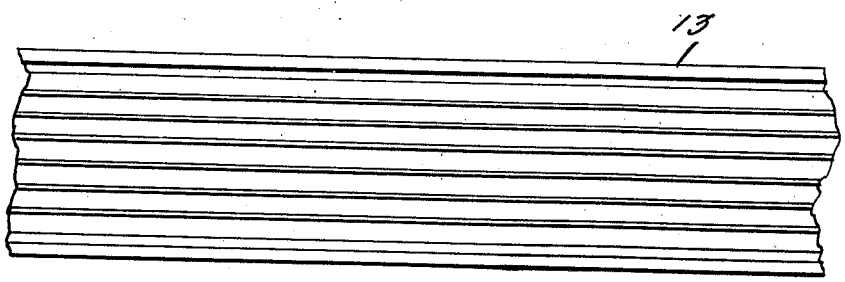
Figure 5 is a fragmentary view, looking at the inside of a portion of the curing ring.

Referring now to the drawings in detail, it will be seen that the embodiment of the invention which has been illustrated comprises a shaft 1 of suitable metal, said shaft including oppositely threaded portions 2. Threadedly mounted on the portions 2 of the shaft 1 for movement toward and away from each other are nuts or the like 3. A removable operating crank 4 is provided on one end portion of the shaft 1.

Pivotally mounted on the nuts 3 are extensible toggles 5. The toggles 5 comprise telescopic male and female sections 6 and 7, respectively, which are secured in adjusted position through the medium of pins or bolts 8. The pins or bolts 8 are mounted in the female sections 7 and are selectively engageable in openings 9 which are provided therefor in the male toggle sections 6.

The outer end portions of the toggles 5 are pivotally connected to cross bars 10. Hingedly mounted on the cross bars 10 are longitudinally curved, circumferentially extending pressure heads 11 having outer faces which are concave in transverse section. The pressure heads 11 have formed therein openings 12 the purpose of which will be presently set forth.

The pressure heads 11 are cooperable with a suitable curing ring 13. In the embodiment shown, the curing ring 13 comprises electric heating means or elements 14. If desired, steam may be utilized as the heating medium. In Figure 3 of the drawings, the tread being applied to a casing 15 is indicated at 16.

It is thought that the operation of the machine will be readily apparent from a consideration of the foregoing. Briefly, the casing 15 to be capped is positioned in the curing ring 13. The pressure unit comprising the members 3, 5, 10, 11, etc., is then positioned and the shaft 1 is turned in a direction to move the nuts 3 toward each other. Thus, the heads 11 are expanded in the casing 15 through the medium of the toggles 5. The construction and arrangement is such that the tread portion only of the casing, to which the cap is to be applied, is brought under pressure between the heads 11 and the curing ring 13, leaving the side walls and beads of said casing free. This opens or spreads the side walls of the casing and transversely concaves the tread portion thereof with the result that the central portion of the cap will be made comparatively deep or thick, as suggested in Figure 3 of the drawings. If desired, a plurality of the devices may be conveniently mounted on a suitable supporting rack 17 (see Figure 1) after the casings have been placed therein and the desired pressure applied. Of course, this pressure may be regulated after the machines have been mounted on the rack 17. When the operation has been completed the shaft 1 is rotated in the opposite direction to withdraw the pressure heads 11 from the casing.

Figure 8:
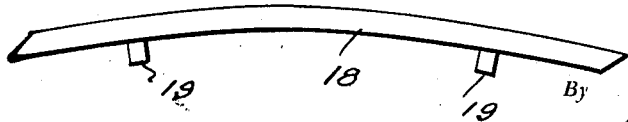
Figure 8 is a view in side elevation of one of the auxiliary pressure heads which are used on comparatively large sizes of casings.
Figure 2:
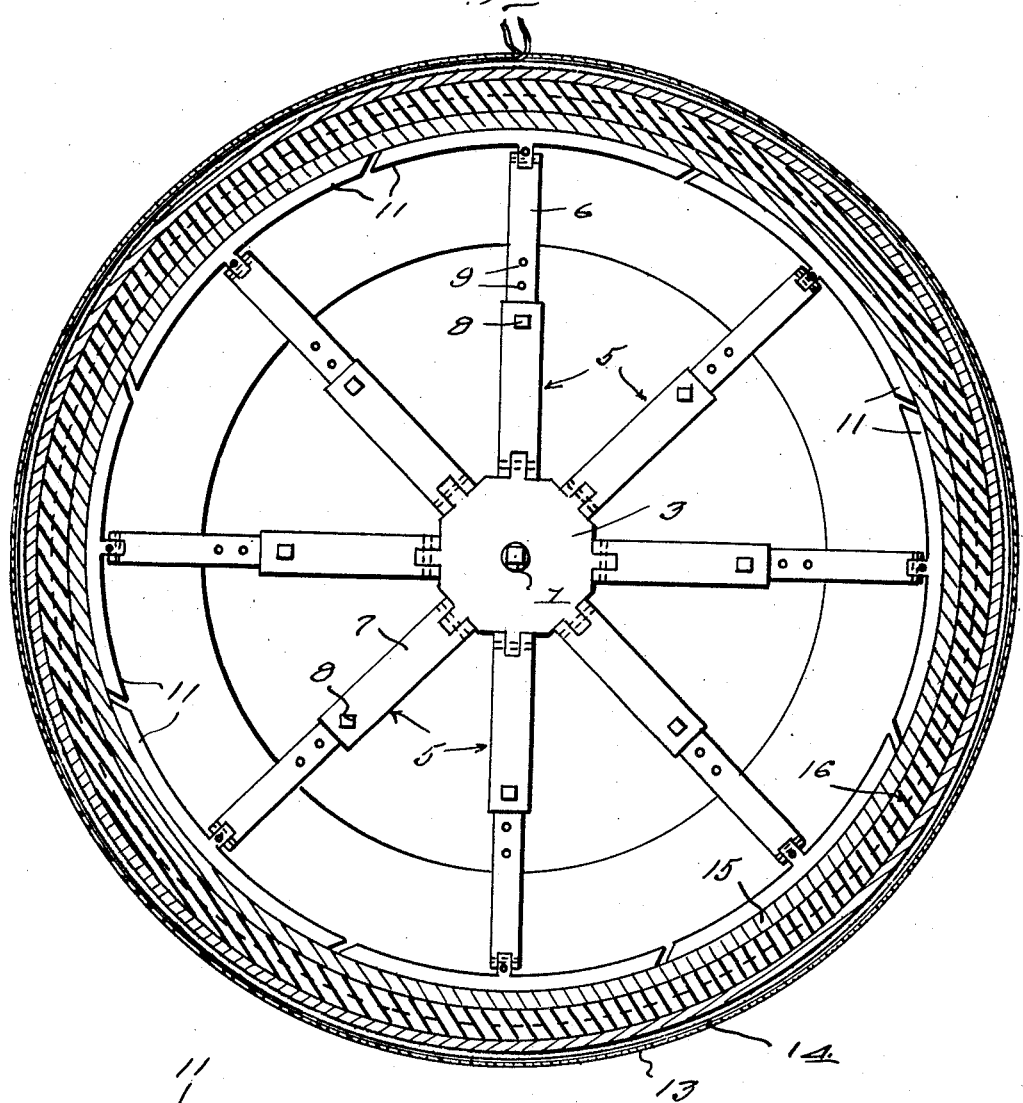
Figure 2 is a view in vertical section through the machine.
Figure 6:
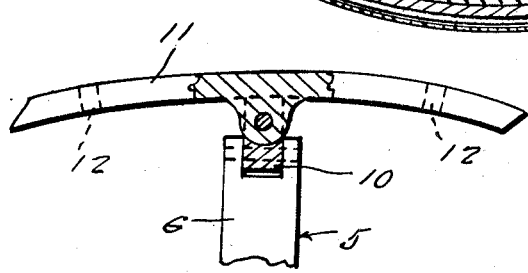
Figure 6 is a view in side elevation of one of the pressure heads, a portion thereof being broken away in section.

In Figure 8 of the drawings an auxiliary pressure head 18 for large size casings is shown. The heads 18 are adapted to be mounted on the heads 11 and said heads 18 are provided with retaining pins 19 which are engageable in the openings 12.

It is believed that the many advantages of a tire capping machine constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

A tire capping machine comprising a curing ring for the reception of a casing, a plurality of pressure heads engageable in the casing and cooperable with the curing ring for compressing said casing therebetween, and means for actuating the pressure heads for compressing the casing in cooperation with the curing ring, said pressure heads being constructed to engage with the tread portion only of the casing and having outer faces concave in transverse cross section for transversely concaving said tread portion of the casing.

JESSE L. SEATON.